United States Patent [19]

Hanning

[11] 4,139,177

[45] Feb. 13, 1979

[54] APPARATUS FOR THE INJECTION-MOLDING AND COOLING OF SHAPED SYNTHETIC-RESIN BODIES

[76] Inventor: Robert Hanning, Via Marco 47, Campione d'Italia (TI), Switzerland, CH-6911

[21] Appl. No.: 801,013

[22] Filed: May 26, 1977

[30] Foreign Application Priority Data

Sep. 9, 1976 [DE] Fed. Rep. of Germany ....... 2640607

[51] Int. Cl.² .......................... B29C 7/00; B29F 1/14
[52] U.S. Cl. .................................. 249/66 C; 249/141; 425/552; 425/812
[58] Field of Search ................ 249/68, 79, 141, 66 A, 249/66 C; 425/4 R, 812, 552, 815, 407, 437; 164/128; 266/113

[56] References Cited

U.S. PATENT DOCUMENTS

| | | | |
|---|---|---|---|
| 2,920,353 | 1/1960 | Strating et al. | 164/128 X |
| 3,169,272 | 2/1965 | Maxson | 425/812 X |
| 3,329,198 | 7/1967 | Manning et al. | 425/812 X |
| 3,392,423 | 7/1968 | Heider et al. | 425/4 R |
| 3,667,248 | 6/1972 | Carlson | 249/79 X |
| 3,671,159 | 6/1972 | Greenberg et al. | 425/552 X |
| 3,704,081 | 11/1972 | Immel | 425/4 R |
| 3,871,811 | 3/1975 | Barry et al. | 425/407 |
| 3,874,830 | 4/1975 | Carter et al. | 425/4 R |

FOREIGN PATENT DOCUMENTS 1353587  5/1974  United Kingdom ...................... 249/79

*Primary Examiner*—William R. Briggs
*Attorney, Agent, or Firm*—The Firm of Karl F. Ross

[57] ABSTRACT

Shaped synthetic-resin bodies are made in a separable mold by injecting a flowable mass of a synthetic-resin material into the mold cavity. To precool the mass and cause an initial setting at least of the surface thereof, a liquefied gas, i.e. a low-boiling liquid which is in a gaseous state at room temperature and atmospheric pressure, is introduced between the mass and the walls of the cavity. The coolant is discharged from the cavity through at least one controllable cross-section outlet to regulate the contact time between the coolant and the mass. The initially set precooled body is injected from the mold and is subjected to final cooling and temperature homogenization (tempering), e.g. in a liquid bath.

7 Claims, 5 Drawing Figures

APPARATUS FOR THE INJECTION-MOLDING AND COOLING OF SHAPED SYNTHETIC-RESIN BODIES

FIELD OF THE INVENTION

The present invention relates to an apparatus for producing shaped synthetic-resin bodies and, more particularly, to apparatus for the injection-molding of foamed or foamable synthetic-resin materials in a mold cavity to form a body consisting of the foamed material throughout its cross section or having a foamed core.

BACKGROUND OF THE INVENTION

It is known to produce shaped synthetic-resin bodies and particularly molded bodies of foamed synthetic resin, or bodies having a core or interior portion of foamed synthetic-resin material, by introducing the flowable synthetic-resin mass in a heated state into a mold consisting of a plurality of separable parts and defining a mold cavity of the desired shape. The mass of synthetic resin in the mold cavity is generally then precooled to cause initial setting or hardening, whereupon the body is ejected from the mold cavity (after opening of the mold). The body can then be finally cooled (finish cooled) under conditions assuring temperature homogenization throughout the cross section of the body, i.e. under tempering conditions.

Such systems have been found to be highly effective for the production of relatively massive bodies, such as articles of furniture, since they permit the removal of the initially set unit from the mold cavity before complete setting and hardening of the body, thereby making it unnecessary to retain the body in the mold for the full setting time and markedly increasing the cycling time of the injection-molding machine.

In the prior-art systems, the mold parts are generally cooled by the feeding of a coolant through passages formed in the mold parts. The injection can be effected by mechanical means, e.g. ejector pins or rods, or pneumatically.

A pneumatic ejector has been described in German Auslegeschrift DT-AS No. 23 24 215 and comprises a source of compressed air which is connected to nozzles which open into the mold cavity and are trained against the surfaces of the mold body therein to force the body out of the mold.

Such systems have been mentioned because the compressed air serving to eject the body has a minor cooling effect upon the body and this represents a form of direct-contact cooling between a gaseous coolant and the synthetic-resin material of the body.

However, this effect is minimal, as noted above, and compared to the conductive cooling effect brought about by the cooling of the mold parts, can be treated as insignificant.

Thus, in spite of the fact that the precooling techniques of the prior art enable the initially set and cooled body to be removed from the mold cavity prior to complete solidification and cooling of the body, the latter must remain in the mold cavity and in contact with the walls of the mold for a relatively long time.

In other words, the duration for which the molded mass must be retained in the mold cavity is determined, even in the case of pneumatic ejection, primarily by the rate at which the indirect cooling of the mold parts is able to conductively abstract (dissipate) heat from the synthetic-resin mass in contact with these parts. Since this duration is the determining factor of the cycling time or rate, the productivity of the injection-molding machine is restricted by the conventional cooling approach and, for a given required output rate of molded bodies, may result in the need for additional machines and high capital expenditure. Furthermore, the conventional systems, because of the thermal inertia of the mold, are of low energy efficiency to the extent that they rely primarily on cooling of the mold to effect the precooling of the molded body.

OBJECTS OF THE INVENTION

It is an important object of the present invention to provide an improved apparatus for the molding of synthetic-resin bodies and particularly bodies consisting in whole or in part of foamable synthetic-resin materials or foamed materials, whereby the aforedescribed disadvantages can be obviated.

A corollary object of the invention is to provide an improved apparatus for the molding of such bodies which can be operated at a higher cycling rate than earlier systems.

It is also an object of this invention to improve the molding and cooling of synthetic-resin bodies and which may have short cycling times, thereby increasing production economy.

SUMMARY OF THE INVENTION

These objects and others which will become apparent hereinafter are attained, in accordance with the present invention, in a method of making a shaped synthetic-resin body which comprises injecting a flowable mass of a synthetic-resin material into a mold cavity defined between at least two separable mold parts; feeding a coolant in the form of liquefied cooling gas between this mass and the walls of the cavity to precool and initially set the mass at least in the surface regions thereof originally in contact with these walls, the liquefied gas flowing between the juxtaposed mold walls and body surfaces and expanding into the space between them; discharging the coolant from the mold cavity through at least one regulatable cross-section outlet to control the contact time between the coolant and the mass; ejecting the initially set mass from the mold; and finish cooling the removed initially set mass to produce the shaped body.

Thus, the invention attains the aforedescribed objects by bringing the synthetic-resin mass or material in the molded cavity into contact with a liquefied cooling gas (low-boiling liquid) which is preferably in a gaseous state at ambient temperature and atmospheric pressure. this liquefied gas being intoduced so that it is discharged from one or more controllable openings after an adjustable flow time in contact with the synthetic-resin material.

While I prefer to remove the molded body after it has been initially set as described above and permit the final setting and cooling to be carried out outside the mold cavity, the use of the liquefied gas coolant so increases the rate at which heat is abstracted from the body that the latter can generally be completely cooled within the mold cavity in a shorter time than has previously been experienced using prior-art systems.

Thus, it is the preferred mode of operation, in accordance with the present invention, to carry out the precooling with the use of the liquefied gas such that the flow or contact time is just sufficient to form a cooled and dimensionally stable surface shell on the molded body and so that the dimensionally stable body can be ejected from the mold cavity and introduced directly into a cooling bath in which it is finished cooled and tempered.

The cooling bath, in its simplest case, can be a water bath at a temperature below the setting temperature of the synthetic-resin material, e.g. at room temperature or lower.

The liquefied gas coolant is preferably carbon dioxide, liquefied air or liquid nitrogen.

The invention makes use of the surprising discovery that, when a liquefied gas coolant is introduced in the described manner between the synthetic-resin mass and the walls of the mold cavity, the surface of the yet plastic and unstable synthetic resin is practically instantaneously solidified or set to a dimensionally stable condition because this liquefied coolant tends to distribute itself uniformly and substantially instantaneously over the entire surface of the synthetic-resin body, especially if one or more openings are provided through which the coolant can escape after a predetermined uniform flow time in contact with the synthetic resin.

The opening or openings can be provided, according to a feature of the present invention, with means for establishing a predetermined back pressure to resist the outflow of the coolant. Such means can include pressure-relief valves or the like.

The synthetic-resin mass in the mold cavity is, as I have discovered, relatively compressible, whether because it contains gas inclusions or because it consists of a foamable material or contains a foamable material, thereby permitting the cooling-spreading effect described above to occur. In other words, because of the yieldability of the walls of the mass juxtaposed with the walls of the mold cavity and the back pressure required before the coolant is released, the liquefied gas spreads rapidly between the surfaces of the molded body and the walls of the cavity until the aforementioned pressure is achieved, whereupon the expanded coolant is discharged through the openings via the pressure-relief valves.

According to another aspect of the invention, the mold consists of a plurality of mold parts which cooperate sealingly at the closure regions via elastic sealing means which permit a limited escape of gas, i.e. which is permeable but presents a resistance to the expanded coolant so that again a pressure buildup occurs before the discharge of the coolant. In this case, as well, effective distribution and flow of the cooling gases is assured.

The invention is characterized by the practically simultaneous formation of a stiff shell on the surface of the synthetic-resin mass practically simultaneously on all of the surfaces thereof so that the mass itself is rendered dimensionally stable and can be ejected with ease, in spite of the fact that inner portions of the mass have neither cooled nor rigidified. The control of the escape of the cooling gases, into which the low-boiling liquid expends, should be controlled to regulate the thickness of this shell. In practice it has been found to be desirable to make the shell as thin as possible to provide dimensional stability without imparting self-standing capabilities to the molded body. Consequently, without the subsequent cooling bath, the precooled body is not self-standing. This has been found to be important since a very thin shell permits the further cooling in the cooling bath to be carried out with a minimum of stress formation and hence without difficulty.

This technique has been found to permit molded configurations to be obtained which have not heretofore been possible by injection-molding. Since the statically supporting shell does not suffer collapse upon treatment in the subsequent cooling bath, the molded articles retain their smooth surfaces.

The cycling time of the apparatus, using the technique of this invention, can be markedly reduced, e.g. to one-quarter or one-tenth of the hitherto customary cooling time in the injection molds. In other words, the introduction of the liquefied cooling gas can be effected practically instantaneously after injection of the synthetic resin and more or less directly. Thereafter, the mold can be opened and the mold body ejected.

The ejection can be effected, in accordance with this invention, by mechanical ejectors or by pneumatic ejectors. The synthetic-resin material is not pressed out of the openings of the ejection mold in carrying out the present invention, especially when the cracks or gaps between the closeable mold parts are controlled to vary the gas-outflow cross section or are provided with seals or the like to form valves having the function described previously. Hence the cracks or gaps can function as the coolant-discharge-controlling orifices or openings. By controlling the gap cross sections, control of the flow of the coolant is readily effected.

More specifically, it has been found that unobjectionable synthetic-resin molded bodies can be formed with high precision to conform to the contours of the die cavity when the liquefied-gas coolant and cooling gas is uniformly distributed over the surfaces of the synthetic-resin mass and is simultaneously discharged at outlet locations constituted by the aforementioned opening or openings of the mold halves for the separation gap thereof. In this case it is only necessary to provide the opening or openings in a manner such that the coolant passes uniformly over the surfaces of the molded mass before being discharged. Consequently, a plurality of such openings is desirable, the openings being uniformly distributed over the flow cavities. Correspondingly, the gap can be formed so that the gap or gaps overall have the same flow resistance. Furthermore, the nozzles through which the coolant is admitted into contact with the synthetic-resin body surfaces or between the surfaces and the walls of the mold, are distributed in a uniform manner and such that the flow paths from these nozzles to the separation gaps of the mold halves or the discharge openings have more or less the same distance.

This has been found to be the best approach when the gap or gaps do not function as discharge openings but in the region of these gaps valve-controlled openings independent of the gaps are provided.

To control the flow or contact time, it is sufficient in the last-mentioned embodiment to pulse the introduction of the liquefied-gas coolant into the mold cavity. A pulsating introduction of the liquefied-gas coolant can be defined as an intermittent introduction of the coolant under pressure. In other words, the gas inflow is turned on and off periodically or with a varying time interval between the pulses. In this case, the duration of the pulses can be used to control the flow and contact time. Alternatively, or in addition, it is possible to control flow and contact time by intermittently opening and closing the discharge openings or the gap through which the coolant emerges.

Surprisingly, the liquefied cooling gas can be effectively introduced into a closed injection mold while the usual molding pressure is applied to the mold-closing means and while any outlet openings are blocked. Thereafter, the outlet openings are unblocked and/or the mold closing pressure is relieved to permit a gap to form between the mold halves to permit discharge of the coolant.

This technique utilizes the fact that because of gas inclusions or intrinsic deformability, the synthetic-resin mass is compressed upon introduction of the liquefied-cooling gas at high pressure, whereupon the mold halves are spread apart so that their elastic seals are no longer effective to block the outflow of the cooling gas and the latter, in liquid form or upon expansion and vaporization, is able to spread and flow uniformly along the surfaces of the molded body. According to a feature of the invention, the liquefied-cooling gas, upon developing a predetermined pressure within the mold cavity upon expansion, can press the mold halves apart sufficiently to permit release of the coolant. This result can be achieved when the pressure within the mold cavity, as a result of the introduction of the liquefied gas, is such that the force opposing the mold closing force exceeds the latter.

In its apparatus aspects, the injection mold, according to the present invention, is provided with the aforementioned outlet or gap and the nozzles for introducing the liquefied gas coolant into the mold cavity. According to a feature of this aspect of the invention, the passages and bores communicating with the nozzles for the liquefied-cooling gas are thermally insulated.

According to a preferred embodiment of the invention, the apparatus is so constructed that the opening or openings for the discharge of the coolant are formed in the gap between the mold halves or in the region of the gap or gaps.

Thus the gaps themselves can form the coolant-discharge openings.

By surface machining and appropriate fitting of the parts of the mold together, the gap or gaps can be made over the entire assembly of uniform, i.e. exact, flow cross section and hence equal flow resistance. When addditional openings, apart from the gap, are provided, they too can have the same flow resistance as the gap so that the vaporized liquid coolant is distributed substantially uniformly between the gap and openings and substantially equal flow-path lengths are provided from each nozzle to the openings or gap through which the respective partial streams of the liquefied coolant emerge.

It has been found to be advantageous to provide, in the regions of the gaps between the mold parts, inserts in the form of sealing elements which can be used for setting the flow resistance in the respective region and, therefore, for equalizing the flow resistance over the entire gap.

The aforedescribed modes of construction and operation can be used alone or in combination with openings which are provided with adjustable pressure-relief valves which unblock the respective openings automatically upon an increase in the pressure within the mold cavity, because of introduction of the liquefied gas coolant, to a predetermined level.

The nozzles through which the liquefied-gas coolant is introduced are likewise distributed over the walls of the mold cavity in a number, size and orientation so as to achieve the aforementioned uniform distribution of the coolant between the mold walls and the surfaces of the molded body. Advantageously, these nozzles are formed as flat nozzles, i.e. nozzles which dispense the liquefied-gas coolant (or coolant gas which can form immediately upon entering the mold cavity by expansion at the nozzle) over a two-dimensional flat region. The nozzles can be sintered-metal porous plates through which the coolant is forced. Alternatively, the nozzles can have the configuration of a gap which remains wide open, whereupon the mold is pulsed, i.e. opened and closed with a stroke of, say, 1 to 2 mm, to permit induction of the coolant and discharge thereof upon expansion of the mold cavity and contraction thereof respectively. This pattern can be repeated with any desired cadence to achieve the desired cooling effect.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
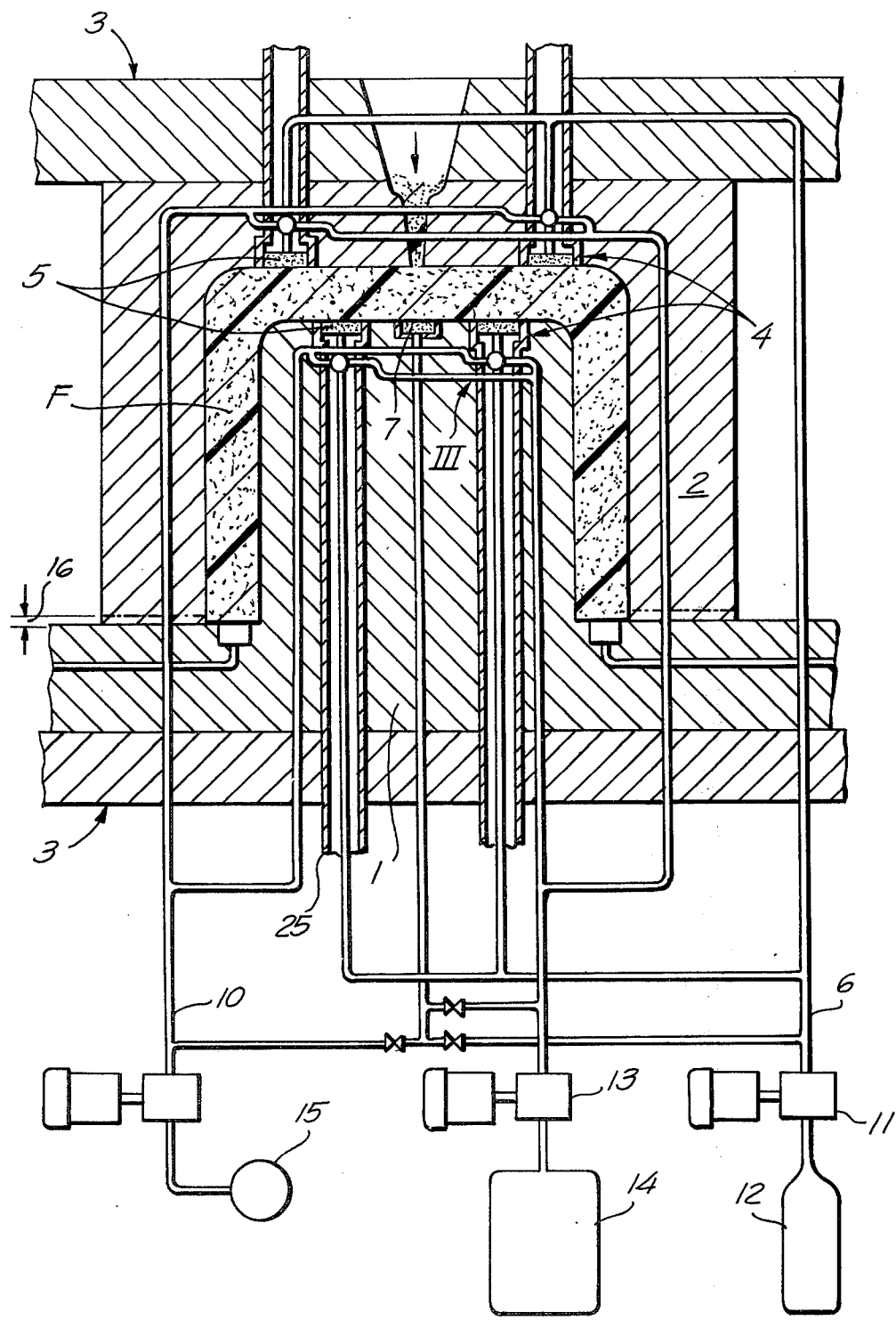
FIG. 1 is a cross-sectional view through an injection mold according to the present invention for producing bodies of thermoplastic synthetic resin.

In the drawing, various structural elements have been shown diagrammatically since the particular configurations may not be significant. For example, the pumps, valves and fluid sources have only been illustrated diagrammatically and can be of any conventional structure operating in the manner to be described. The system for actuating the ejector plungers has not been illustrated and can be of any conventional design, e.g. utilizing a lost motion ejector carrier or the like.

The injection-molding head or ram and the chamber from which the synthetic-resin material is injected into the mold has not been illustrated and also are of conventional construction. Finally, the mold-closing means which retains the two mold parts together can be of conventional design as well.

The apparatus illustrated in the drawing is intended for the injection-molding and cooling of shaped synthetic-resin bodies of thermoplastic material and preferably of a foamable material so that the synthetic resin expands within the mold cavity after injection (i.e. foam injection). The apparatus comprises a two-part injection mold, 1, 2, here shown to define a mold cavity in the shape of an article of furniture or box configuration. The mold parts 1 and 2 are respectively carried by the platens 3 which form part of the mold opening and mold closing device (not shown) whereby the mold parts can be spread apart for ejection of the molded article. The actuating means for the ejectors is also not seen in the drawing although it can comprise thermally insulated plungers 25 which can be used in conjunction with or independently of pneumatic ejectors.

The plungers 25, to facilitate subsequent description are considered to form part of an ejector means 4.

The mold parts 1 and 2 can be internally cooled and can be provided with cooling channels or passages (not shown) of conventional configuration.

Thus, the plungers 25 of the ejection means 4, which are integrated with the mold 1, 2, can be formed as coolant ducts which terminate in respective nozzle heads 5. To this end, the plungers can be provided with externally-insulated coolant passages 6 communicating with the nozzle heads. In a preferred embodiment of the invention, the nozzles for introducing the liquefied-gas coolant into the mold cavity are constituted as fixed nozzles and are formed directly in the wall of the wall cavity independently of the ejection means as shown at 7. Of course, as has been illustrated in FIG. 1, nozzles can be provided both in the plungers of the ejector means and independently thereof. The nozzle configurations of FIGS. 3-5 apply both to the nozzles 5 and to the nozzles 7.

Figure 3:
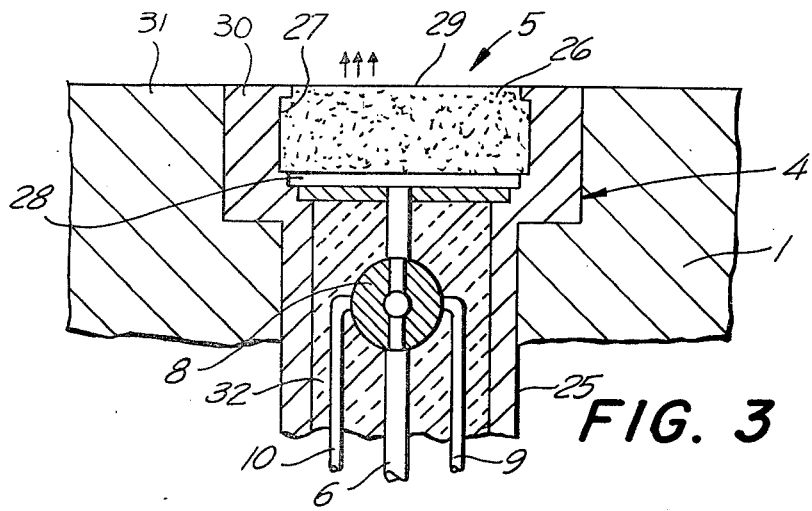
FIG. 3 is a detailed view, drawn to an enlarged scale of the region III of FIG. 1.

The nozzle heads 5 or 7 can be composed, for example, of a porous material (sintered metal) as has been illustrated in FIG. 3, the sintered metal body 26 being seated in a socket 27 constructed and arranged to receive this body and to define a distribution chamber 28 communicating with the surface of the sintered body turned away from the mold cavity. The sintered body 26 can have its fluid-emitting surface 29 flush with the end 30 of the plunger 25 and with the adjacent surface 31 of the wall of the cavity in a retracted position of the plunger. Thermal insulation for the passage 6 is represented at 32.

Figure 4:
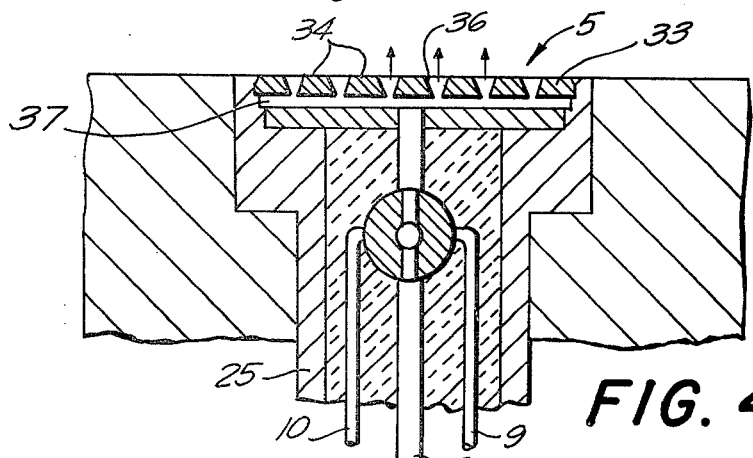
FIGS. 4 and 5 are views similar to FIG. 3 illustrating other embodiments of the coolant-discharge passages or nozzles of the present invention.
Figure 5:
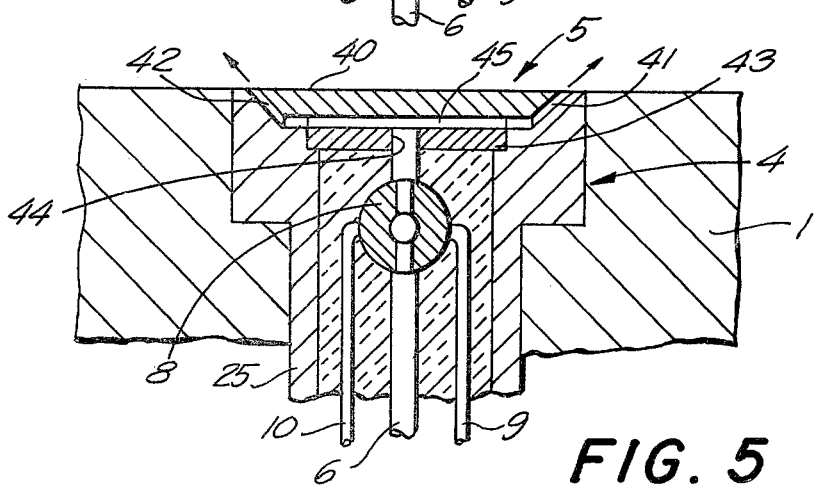

In FIG. 4, I have shown a slit-type nozzle 5 which functions in a manner similar to that of FIG. 3 and wherein a nozzle body 33 is received in the end of a plunger 25. The nozzle body 33 consisting of a plurality of bars 34 defining outwardly widening slits 36 between them. As the liquefied-gas coolant emerges from these slits 36, it expands and vaporizes to distribute itself along the surfaces of the molded object F. The slits 36 communicate with the distribution chamber 37 which is fed with the liquefied gas via the passage 6 as previously described. In this embodiment as well, the rectangular insert 33 lies flush with the mold wall.

Still another nozzle arrangement 5 has been illustrated in FIG. 6 and, in this case, comprises a plate 40 whose beveled edges 41 define oppositely inclined slots 42 through which the coolant emerges. The plate 40 is attached to a further plate 43 which is here shown to be received in the plunger 25 and to have a bore 44 communicating between the passage 6 and the distribution chamber 45.

In order to bring about the pulsed introduction of the coolant, i.e. to generate the coolant pulses, or to feed another coolant or other fluid to the mold cavity, each of the nozzle heads 5 or the nozzles 7 is provided with a respective high-pressure valve 8 which can be of the remotely controlled distributing type and has only been diagrammatically illustrated in the drawing. Each such valve communicates via the passage 6 with a source of the liquefied gas and via lines 9 and 10 with other fluid sources, e.g. of compressed air for facilitating ejection of the molded body by the pneumatic principles mentioned above.

The passages 6 may communicate, via respective valves with a pump 11, e.g. a Diesel pump, with a corresponding liquefied gas reservoir represented as a nitrogen bottle 12.

When compressed air is to be introduced to facilitate pneumatic ejection of the workpiece, it can be supplied via respective valves from a compressor through a filter 15 from the atmosphere. A pump 13 with a reservoir 14 can also be connected to the appropriate passages 9 or 10 to feed other fluids to the mold cavity. Best results have been obtained, however, in the injection-molding of articles from thermoplastic synthetic resins, when the shaped body F is subjected to coolant pulses as described.

Figure 2:
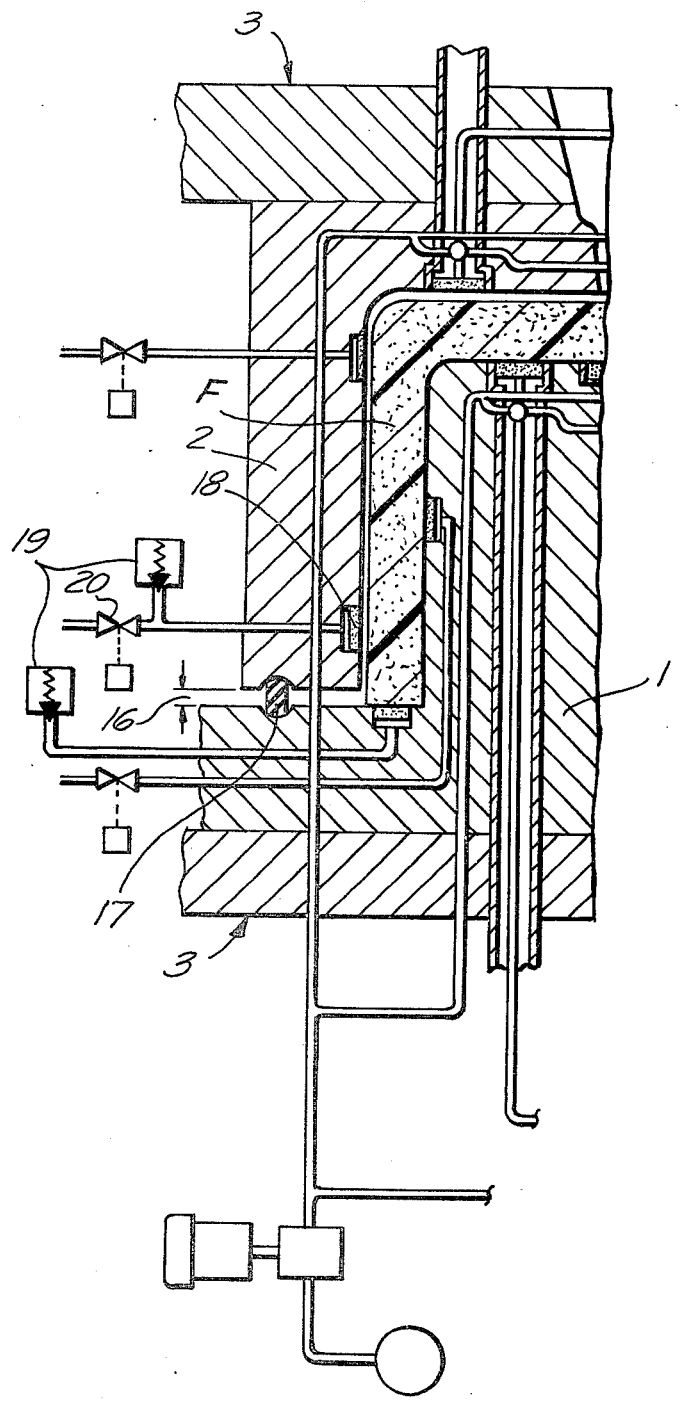
FIG. 2 is a similar cross-sectional view through the left hand portion of a mold illustrating another embodiment of the invention.

As can be seen especially from FIGS. 1 and 2, the several mold parts define gaps between them as represented, for example, at 16, while openings 18 can be distributed along the walls of the mold. In the embodiment of FIG. 1, the gap 16 is formed by machining the parts of the mold so that the gap has throughout a constant flow resistance, i.e. resistance to the escape of the coolant through the gap. In this case, the gap may be formed automatically when the pressure upon expansion of the coolant between the mold walls and the article exceeds the mold closing pressure. The nozzles 5 and 8 are so disposed with respect to the gap 16 that the coolant flow paths from each nozzle to the gap along the surfaces of the molded article are the same.

In addition, or alternatively, the discharge openings 18 can be provided and can be formed with sintered-metal porous plates of the type shown at 26 in FIG. 3 to provide a controlled resistance to the outflow of the coolant. If the gap 16 is not to serve for release of the coolant, it can be provided with an elastic seal 17. The flow time of the coolant along the surfaces of the workpiece is controlled by providing each of the outlets 18 with a respective controlled valve 20 and pressure-relief valve 19 as has been illustrated in FIG. 2. The coolant flow may be commenced by introducing coolant into the mold cavity and permitting the pressure development thereof to reach a point at which the pressure exceeds the threshold pressure of the respective valve 19. The latter than unblocks the openings and permits escape of the coolant and hence flow thereof for a period equal to that required to drop the pressure in the mold cavity below the threshold pressure of valve 19. Alternatively, the valves 20 can be periodically opened and closed to provide the coolant flow pulses.

In operation, the mold is closed in the usual manner and the foamable synthetic resin is injected. Immediately upon the termination of the injection step and upon complete filling of the mold, the liquefied gas coolant is introduced from the heads 5 and 7 in a succession of pulses to flow uniformly over the surface of the synthetic-resin mass and provide a dimension-stabilizing sheath of extremely small thickness thereon by setting or hardening of the synthetic-resin material. The body is immediately ejected with opening of the mold into a bath of water for final cooling and tempering.

I claim:

1. An apparatus for making a molded synthetic-resin body comprising:
    a plurality of separable molded parts defining a mold cavity between them in a closed position of said mold parts;
    means connected with the mold cavity for introducing between the walls of said cavity and surfaces of the synthetic-resin material therein a liquefied-gas coolant substantially uniformly over said surfaces, said means for introducing said liquefied-gas coolant into said mold cavity comprising a plurality of nozzles opening at said walls of said cavity and respective passages in said mold parts communicating with said nozzles, said mold parts being formed with at least one coolant outlet for discharging said coolant from said mold cavity, said outlet being constituted as a gap formed between said parts and communicating with the interior of the mold cavity, said gap being dimensioned to have over its entire length substantially the same fluid flow resistance; and means for controlling said flow resistance.

2. The apparatus defined in claim 1 wherein said passages are thermally insulated.

3. The apparatus defined in claim 1 wherein said mold parts define a gap between them communicating with the interior of the mold cavity, said apparatus further comprising an elastic seal bridging said gap.

4. The apparatus defined in claim 3 wherein said outlet is formed as a plurality of openings in at least one of said mold parts in the region of said gap.

5. The apparatus defined in claim 1 wherein said outlet includes openings disposed around said cavity and oriented such that the distance between said nozzles and said openings is substantially constant all along said surfaces of the synthetic-resin material.

6. The apparatus defined in claim 1 wherein said nozzles are provided as porous sintered-metal plates.

7. The apparatus defined in claim 1 wherein at least one of said mold parts is provided with a plurality of ejector plungers, each formed with a respective one of said nozzles and receiving a corresponding passage communicating therewith.

* * * * *